United States Patent
Broomhall et al.

(10) Patent No.: US 9,471,468 B2
(45) Date of Patent: Oct. 18, 2016

(54) SYSTEM, METHOD, AND COMPUTER PROGRAM TO IMPROVE THE PRODUCTIVITY OF UNIT TESTING

(71) Applicant: INTERNATIONAL BUSINESS MACHINES CORPORATION, Armonk, NY (US)

(72) Inventors: Matthew E Broomhall, Goffstown, NH (US); Li Long Chen, Beijing (CN); Li Kong, Beijing (CN); Yi Nan Ren, Beijing (CN); Shao Fei Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/557,582

(22) Filed: Dec. 2, 2014

(65) Prior Publication Data
US 2016/0154727 A1 Jun. 2, 2016

(51) Int. Cl.
*G06F 9/44* (2006.01)
*G06F 11/36* (2006.01)

(52) U.S. Cl.
CPC ........ *G06F 11/3672* (2013.01); *G06F 11/3688* (2013.01)

(58) Field of Classification Search
CPC ........... G06F 11/3672; G06F 11/3684; G06F 11/3692; G06F 11/3688
See application file for complete search history.

(56) References Cited

U.S. PATENT DOCUMENTS

| | | | | |
|---|---|---|---|---|
| 7,167,870 | B2 * | 1/2007 | Avvari | G06F 11/3676 707/609 |
| 7,480,900 | B1 * | 1/2009 | Zhou | G06F 11/3676 714/38.1 |
| 8,205,191 | B1 | 6/2012 | Kolawa et al. | |
| 8,276,123 | B1 * | 9/2012 | Deng | G06F 11/368 714/37 |
| 8,490,072 | B2 * | 7/2013 | Andrade | G06F 8/433 717/132 |
| 8,561,036 | B1 * | 10/2013 | Beans et al. | 717/140 |

(Continued)

OTHER PUBLICATIONS

JoaAo W. Cangussu et al.; A Formal Model of the Software Test Process; 2002 IEEE; pp. 782-796; <http://ieeexplore.ieee.org/stamp/stamp.jsp?tp=&arnumber=1027800>.*
Jeffrey S. Vetter et al.; Dynamic Software Testing of MPI Applications with Umpire; 2000 IEEE; 10 pages; <http://ieeexplore.ieee.org/stamp/stamp.jsp?tp=&arnumber=1592764>.*

(Continued)

*Primary Examiner* — Thuy Dao
*Assistant Examiner* — Cuong V Luu
(74) *Attorney, Agent, or Firm* — Scully, Scott, Murphy & Presser, P.C.; Kurt P. Goudy, Esq.

(57) ABSTRACT

A method, system, and computer program for improving productivity of code development is provided. The method includes calculating an edge weight between nodes of a directed graph for a code project, where the nodes include a source node and a sink node, the source node corresponds to a method and the sink node corresponds to a testcase, calculating a flow value from an identified source node to the sink node, where the identified source node includes a source file of the method that has been changed and generating a list of testcases that correspond the sink node whose calculated flow value is greater than or equal to a threshold flow value.

18 Claims, 3 Drawing Sheets

(56) References Cited

U.S. PATENT DOCUMENTS

| | | | | |
|---|---|---|---|---|
| 2004/0133880 | A1* | 7/2004 | Paternostro | G06F 11/3688 717/124 |
| 2006/0075305 | A1* | 4/2006 | Robinson et al. | G06F 11/00 714/38 |
| 2010/0325621 | A1* | 12/2010 | Andrade | G06F 8/433 717/156 |
| 2011/0145788 | A1 | 6/2011 | Xu et al. | |
| 2014/0082594 | A1* | 3/2014 | Li | G06F 8/436 717/126 |
| 2014/0245267 | A1* | 8/2014 | Wang | G06F 11/3672 717/124 |
| 2015/0205706 | A1* | 7/2015 | Michelsen | G06F 8/34 717/125 |

OTHER PUBLICATIONS

Barry W. Boehm; A Spiral Model of Software Development and Enhancement; 1988 IEEE; pp. 61-72; <http://ieeexplore.ieee.org/stamp/stamp.jsp?tp=&arnumber=59>.*

Yue Jiang et al.; Comparing Design and Code Metrics for Software Quality Prediction ; 2008 ACM; pp. 11-18; <http://dl.acm.org/citation.cfm?id=1370793>.*

Sebastian Elbaum et al.; Selecting a Cost-Effective Test Case Prioritization Technique; 2004 Kluwer; pp. 185-210; <http://link.springer.com/article/10.1023/B:SQJO.0000034708.84524.22 .*

Mei-Hwa Chen et al.; Effect of Code Coverage on Software Reliability Measurement; 2001 IEEE; pp. 165-170; <http://ieeexplore.ieee.org/stamp/stamp.jsp?tp=&arnumber=963124>.*

* cited by examiner

SYSTEM, METHOD, AND COMPUTER PROGRAM TO IMPROVE THE PRODUCTIVITY OF UNIT TESTING

BACKGROUND OF THE INVENTION

1. Field of the Invention

The present invention relates to testing computer software. More particularly, the present invention is related to a method, system, and computer program for identifying a relationship between the source code changed and unit test cases.

2. Description of Related Art

A project with test-driven development (TDD) requires many unit test cases to validate the development quality. For many projects, finishing all unit test cases can be a drawn-out process, especially in daily builds.

Unit testing is a method to verify whether individual units of source code satisfy certain requirements and are fit for use. It has become a key phrase in traditional software development, as well as TDD. Usually a complete unit test case set is large, so running all test cases takes a long time. This is especially the case when a test target contains database operations, service calls, or I/O operations. It can become a waste of effort when daily code changes are performed that do not impact most test cases.

SUMMARY OF THE INVENTION

According to a first aspect of the present invention, a method for improving productivity of code development is provided. The method includes calculating an edge weight between nodes of a directed graph for a code project, where the nodes include a source node and a sink node, the source node corresponds to a method and the sink node corresponds to a testcase, calculating a flow value from an identified source node to the sink node, where the identified source node includes a source file of the method that has been changed and generating a list of testcases that correspond the sink node whose calculated flow value is greater than or equal to a threshold flow value.

According to a second aspect of the present invention, a system for improving productivity of code development is provided. The system includes: a memory; a processor device communicatively coupled to the memory; and a module for improving productivity of code development coupled to the memory and the processor device to carry out the steps of a method including calculating an edge weight between nodes of a directed graph for a code project, where the nodes include a source node and a sink node, the source node corresponds to a method and the sink node corresponds to a testcase, calculating a flow value from an identified source node to the sink node, where the identified source node includes a source file of the method that has been changed, and generating a list of testcases that correspond the sink node whose calculated flow value is greater than or equal to a threshold flow value.

According to a third aspect of the present invention, a computer program product for improving productivity of code development is provided. The computer program product includes a computer readable storage medium having program instructions embodied therewith, the program instructions readable/executable by a device to cause the device to perform a method including calculating an edge weight between nodes of a directed graph for a code project, where the nodes include a source node and a sink node, the source node corresponds to a method and the sink node corresponds to a testcase, calculating a flow value from an identified source node to the sink node, where the identified source node includes a source file of the method that has been changed and generating a list of testcases that correspond the sink node whose calculated flow value is greater than or equal to a threshold flow value.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION OF THE PREFERRED EMBODIMENTS

Figure 1:
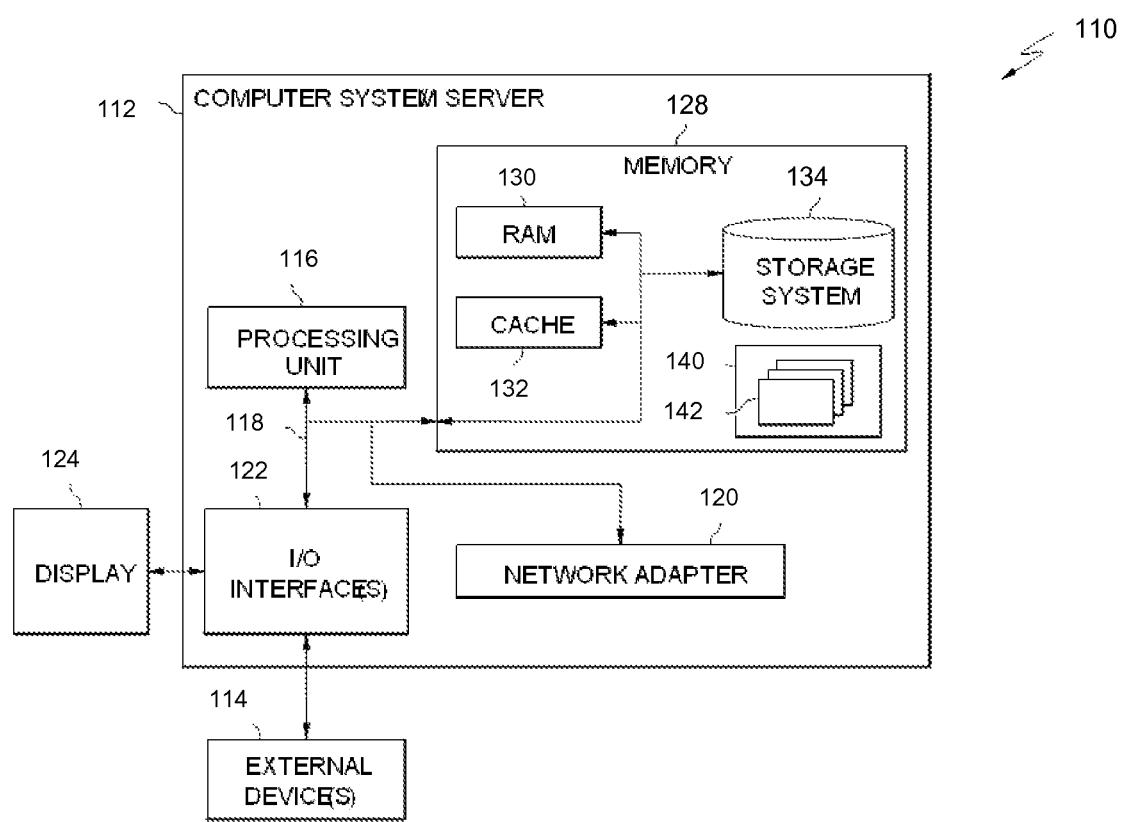
FIG. 1 is a depiction of an exemplary computer system/server, according to an embodiment of the present invention.

Aspects of the present disclosure relate to improving unit testing. Unit test cases can be tailored more effectively before actual execution. The source code can be analyzed from the latest change made. From this analysis, the required test cases are generated. While the present disclosure is not necessarily limited to such applications, various aspects of the disclosure can be appreciated through a discussion of various examples using this context.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a block diagram of an exemplary computer system/server 110 which is applicable to implement the embodiments of the present invention. The computer system/server 110 shown in FIG. 1 is only illustrative and is not intended to suggest any limitation as to the scope of use or functionality of embodiments of the invention described herein. As shown in FIG. 1, computer system/server 112 is shown in the form of a general-purpose computing device. The components of computer system/server 112 can include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Computer system/server 112 typically includes a variety of computer system readable media. Such media can be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 can further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 can include at least one program product having a set (e.g., at least one) of program modules that are configured to carry out the functions of embodiments of the invention.

Program/utility 140, having a set (at least one) of program modules 142, can be stored in memory 128, by way of example, and not limitation, as well as an operating system, one or more application programs, other program modules, and program data. Each of the operating system, one or more application programs, other program modules, and program data or some combination thereof, can include an implementation of a networking environment. Program modules 142 generally carry out the functions and/or methodologies of embodiments of the invention as described herein.

Computer system/server 112 can also communicate with one or more external devices 114 such as a keyboard, a pointing device, an image capturing device, a lighting control device, a display 124, etc.; one or more devices that enable a user to interact with computer system/server 112; and/or any devices (e.g., network card, modem, etc.) that enable computer system/server 112 to communicate with one or more other computing devices. Such communication can occur via Input/Output (I/O) interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components can be used in conjunction with computer system/server 112. Examples, include, but are not limited to: microcode, device drivers, redundant processing units, external disk drive arrays, RAID systems, tape drives, and data archival storage systems, etc.

Figure 2:
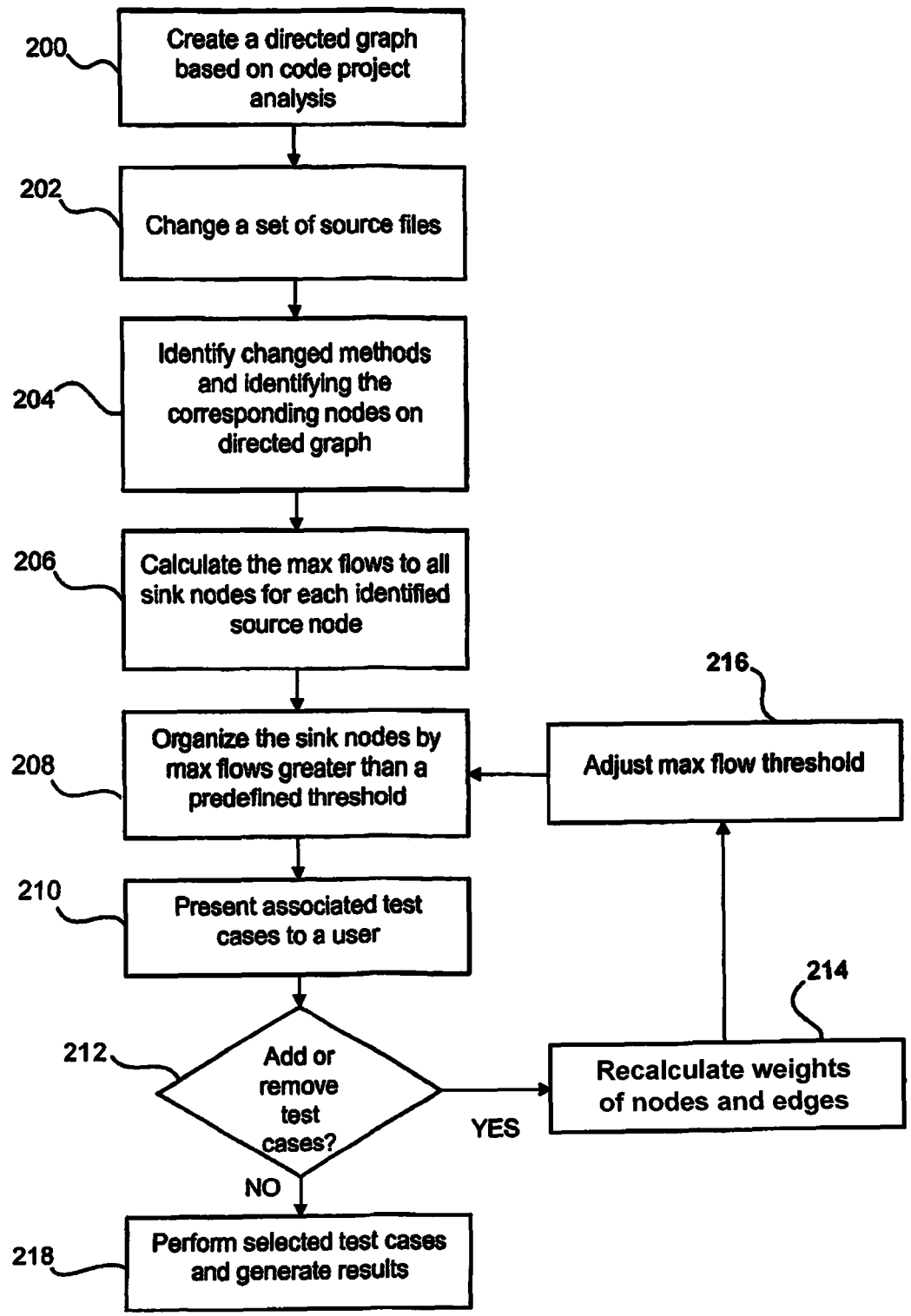
FIG. 2 is a flowchart of the method according to an embodiment of the present invention.

FIG. 2 is an embodiment of unit testing program implemented on the computing device 100. In Step 200, code projects are analyzed in an integrated development environment (IDE) and a directed graph is created based on the code project analysis. For an object oriented program such as a Java program, a target program unit can be a target class. Preferably, the step 200 is performed in a development environment. The step can be performed in a Graphic User Interface (GUI) tool, that is, the user can specify the target classes and runtime problem through the GUI tool, which will in turn generate the configuration information including the determined target classes and runtime problems to be provided to the next step according to the user's specification. The step can also be performed manually by the user, that is, the user can manually formulate the configuration information including the specified target classes and runtime problems to be provided to the next step; the step can also be combined with the next step of modifying the target problem, which is to be described hereinafter, that is, the interested target classes and runtime problems are embodied in how and where the target program is to be modified, and in this case, the method may not have the specifying step. The target classes include classes to be unit tested. All objects of a target class will be tracked in order to generate a unit test case. A target class can be determined through its qualified name.

Figure 3:
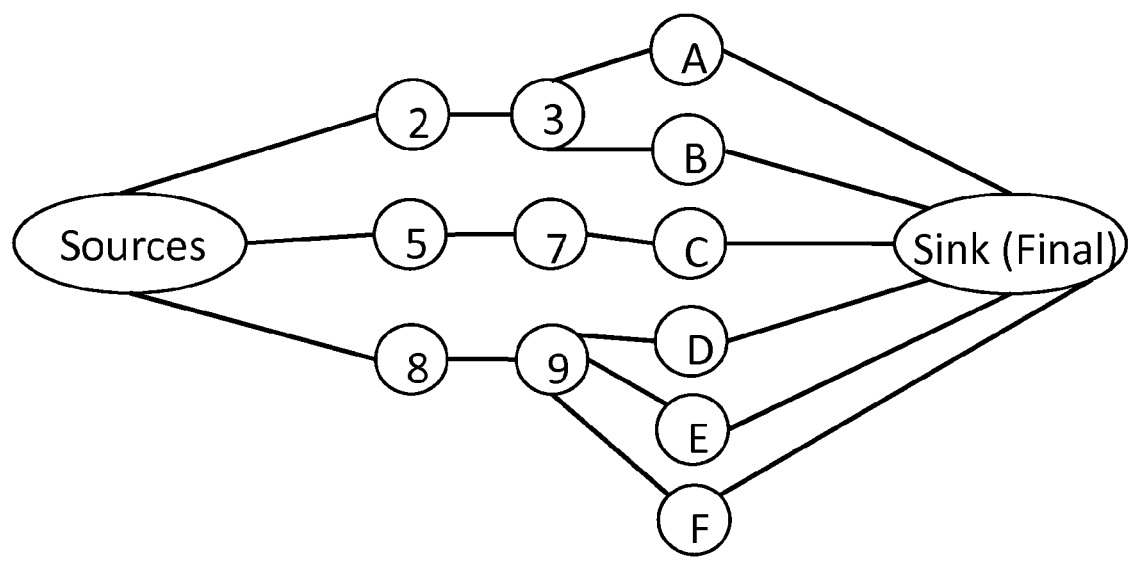
FIG. 3 is a depiction of an exemplary node graph, according to an embodiment of the present invention.

The method creates a directed graph as shown in FIG. 3. The directed graph which can contain nodes, source nodes, sink nodes and edges. Within the context of the directed graph, the nodes represent methods, the source node represents methods, the sink node is the target test node, and the edges represent the relationship between the nodes and weights. The edges are based on the call hierarchy. The edge weights are then calculated and an initial threshold for accepted max flow rate is set. The system revises the edges based on the historical manual intervention after learning user actions.

By way of example, a user is working on a project named Project X. Project X consists of four hundred methods in fifty source files together with three hundred test units. The methods and test units are analyzed by system and rated by the complexity of content in methods and test units, the times called by other methods and the number of calls to other methods. In step 200, the relationship between methods and unit test cases are modeled in said directed graph. For example, Method 1 calls Method 2 through a direct relationship. Method 1 and Method 3 access the same data table through an indirect relationship. Test Case A calls Method 2 and Method 3, while Test Case B depends on input from Test Case C.

In Step 202, the user makes changes to a set of source files. For example, a user can fix a code defect in the source code within two source files. The user must update or create the new test cases to test the code change. After compiling, the user uses the system to get test case list based on the code changes.

In Step 204, the system identifies methods that have been changed and identifies the corresponding nodes on the directed graph. For example, the two source files the user changes previously are related with Methods 2, 5, and 8. As shown in the directed graph example in FIG. 3, the method will recognize changes and identify that Node 3, 7, and 9 correspond to Method 2, 5, and 8 respectively. The Sink Nodes are also identified based on the relationship between Nodes, Source Nodes and Sink Nodes through edges.

In Step 206, the system calculates the max flows to all Sink Nodes for each of the identified source nodes based on a Max Flow/Min Cut Theorem. After the calculation, all Sink Nodes have their rated value based on weight of nodes and edges in the directed graph. The advantages of utilizing the Max Flow/Min Cut Theorem is the high accuracy regarding direct and indirect relationships between code changes. For example, as shown in FIG. 3, the system can calculate the max flows from Source Node 3, 7, and 9 to all sink nodes. Each flow from one Source Node to one Sink Node has its max flow value based on the weight of nodes in this flow and weight of edges between nodes. This can represent the importance of Sink Node to test the Source Node.

In Step 208, the system sorts the Sink Nodes by the calculated max flows and pulls out Sink Nodes with max flows greater than a predefined threshold, for example the system organizes the sink nodes by the max flows greater than the predefined threshold. The predefined value is a variable based on test coverage. It is a trade-off for timing and testing coverage. The predefined value can be adjusted based on development phase. In an early stage, the predefined value is bigger, which means only important functions are tested to ensure the change is not impacting the main function. Otherwise, the predefined value becomes smaller to ensure all functions are tested before move to next stage. For example, as shown in FIG. 3, the method finds that two sink nodes (A, B) correspond to Source Node 3, one sink node (C) corresponds to Source Node 7, and three sink nodes (D, E, F) correspond to Source Node 9. All of said sink nodes have max flows greater than a predefined value.

In Step 210, the system generates a list of test cases by presenting the calculated sink nodes in step 208 to a user, and for example, the system presents the list of test cases to the user. This candidate list can be revised by user manually or run directly.

A user can add or remove a test case. This provides the user to optimize the development test to the user's liking without having to test the whole project. It is determined whether a test case is added or removed by a user in Step 212.

In Step 214, if a user adds or removes a test case, the weight of sink nodes and edges will be re-calculated based on user actions. For example, a user adds two test cases to the list presented. The method updates the directed graph and finds that the newly added two test cases relate to Method 5 and 8. The method increases the weight between those two cases. In contrast, if a user deletes two test cases from the list presented, the method will decrease the weight between the identified source nodes. In Step 216, the recalculated weight of the sink nodes and edges can adjust the max flow threshold.

If it is determined that a user does not add or remove a test case in the Step 212, the system performs the selected test cases and generates the results in Step 218. The results can include a list of test cases, the code coverage of the unit testing, etc. The user can use this result to test the code changes with required test cases and less time and effort. The user can also revise the test case list after testing based on test coverage report. This optimizes the accuracy of system.

The descriptions of the various embodiments of the present disclosure have been presented for purposes of illustration, but are not intended to be exhaustive or limited to the embodiments disclosed. Many modifications and variations will be apparent to those of skill in the art without departing from the scope and spirit of the described embodiments. The terminology used herein was chosen to explain the principles of the embodiments, the practical application or technical improvement over technologies found in the marketplace, or to enable others of skill in the art to understand the embodiments disclosed herein.

What is claimed is:

1. A computer-implemented computer software testing method for improving productivity of code development, the method comprising executing on a processor the steps of:
   calculating an edge weight between nodes of a directed graph for a code project, wherein the nodes include a source node and a sink node, the source node corresponds to a method and the sink node corresponds to a test case;
   calculating a flow value from an identified source node to the sink node, wherein the identified source node includes a source file of the method that has been changed;
   generating a list of test cases that correspond to the sink node whose calculated flow value is greater than or equal to a threshold flow value; and
   adjusting the threshold flow value to adjust a test coverage.

2. The method according to claim 1, further comprising adding or removing an additional test case to the list of test cases.

3. The method according to claim 2, further comprising:
   in response to adding or removing the additional test case to the list of test cases, adjusting the edge weight between the identified source node and the sink node that correspond to the added or removed test case;
   calculating the flow value from the identified source node to the sink nodes based on the adjusted edge weight; and
   generating a new list of test cases that correspond to the sink node, if the calculated flow value is greater than or equal to the threshold flow value.

4. The method according to claim 1, wherein calculating the flow value to the sink node for the identified source node is based on max-flow min-cut theorem.

5. The method according to claim 1, wherein the edge weight is based on a relationship between the method and the test case.

6. The method according to claim 1, wherein the threshold flow value is based on a relationship between the method to at least one additional method and a relationship between the test case and at least one additional test case.

7. A computer program product for improving productivity of code development, the computer program product comprising a computer readable storage medium having program instructions stored thereon, the program instructions readable/executable by a processor device to cause the processor device to perform a method comprising:
   calculating an edge weight between nodes of a directed graph for a code project, wherein the nodes include a source node and a sink node, the source node corresponds to a method and the sink node corresponds to a test case;
   calculating a flow value from an identified source node to the sink node, wherein the identified source node includes a source file of the method that has been changed;
   generating a list of test cases that correspond to the sink node whose calculated flow value is greater than or equal to a threshold flow value; and
   adjusting the threshold flow value to adjust a test coverage.

8. The computer program product according to claim 7, further comprising adding or removing an additional test case to the list of test cases.

9. The computer program product according to claim 8, further comprising:
   in response to adding or removing the additional test case to the list of test cases, adjusting the edge weight between the identified source node and the sink node that correspond to the added or removed test case;
   calculating the flow value from the identified source node to the sink nodes based on the adjusted edge weight; and
   generating a new list of test cases that correspond to the sink node, if the calculated flow value is greater than or equal to the threshold flow value.

10. The computer program product according to claim 7, wherein calculating the flow value to the sink node for the identified source node is based on max-flow min-cut theorem.

11. The computer program product according to claim 7, wherein the edge weight is based on a relationship between the method and the test case.

12. The computer program product according to claim 7, wherein the threshold flow value is based on a relationship between the method to at least one additional method and a relationship between the test case and at least one additional test case.

13. A system for improving productivity of code development, the system comprising:

a memory;
a processor device communicatively coupled to the memory; and
a module for improving productivity of code development coupled to the memory and the processor device to carry out the steps of a method comprising:
calculating an edge weight between nodes of a directed graph for a code project, wherein the nodes include a source node and a sink node, the source node corresponds to a method and the sink node corresponds to a test case;
calculating a flow value from an identified source node to the sink node, wherein the identified source node includes a source file of the method that has been changed;
generating a list of test cases that correspond the sink node whose calculated flow value is greater than or equal to a threshold flow value; and
adjusting the threshold flow value to adjust a test coverage.

14. The system according to claim 13, further comprising adding or removing an additional test case to the list of test cases.

15. The system according to claim 14, further comprising:
in response to adding or removing the additional test case to the list of test cases, adjusting the edge weight between the identified source node and the sink node that correspond to the added or removed test case;
calculating the flow value from the identified source node to the sink nodes based on adjusted edge weights; and
generating a new list of test cases that correspond to the sink nodes, if the calculated flow value is greater than or equal to the threshold flow value.

16. The system according to claim 13, wherein calculating the flow value to the sink node for the identified source node is based on max-flow min-cut theorem.

17. The system according to claim 13, wherein the edge weight is based on a relationship between the method and the test case.

18. The system according to claim 13, wherein the threshold flow value is based on a relationship between the method to at least one additional method and a relationship between the test case and at least one additional test case.

* * * * *